Feb. 2, 1971            A. S. IBERALL          3,559,478
INERTIAL SENSING SYSTEM FOR USE IN NAVIGATION AND GUIDANCE
Filed April 5, 1967                                2 Sheets-Sheet 1
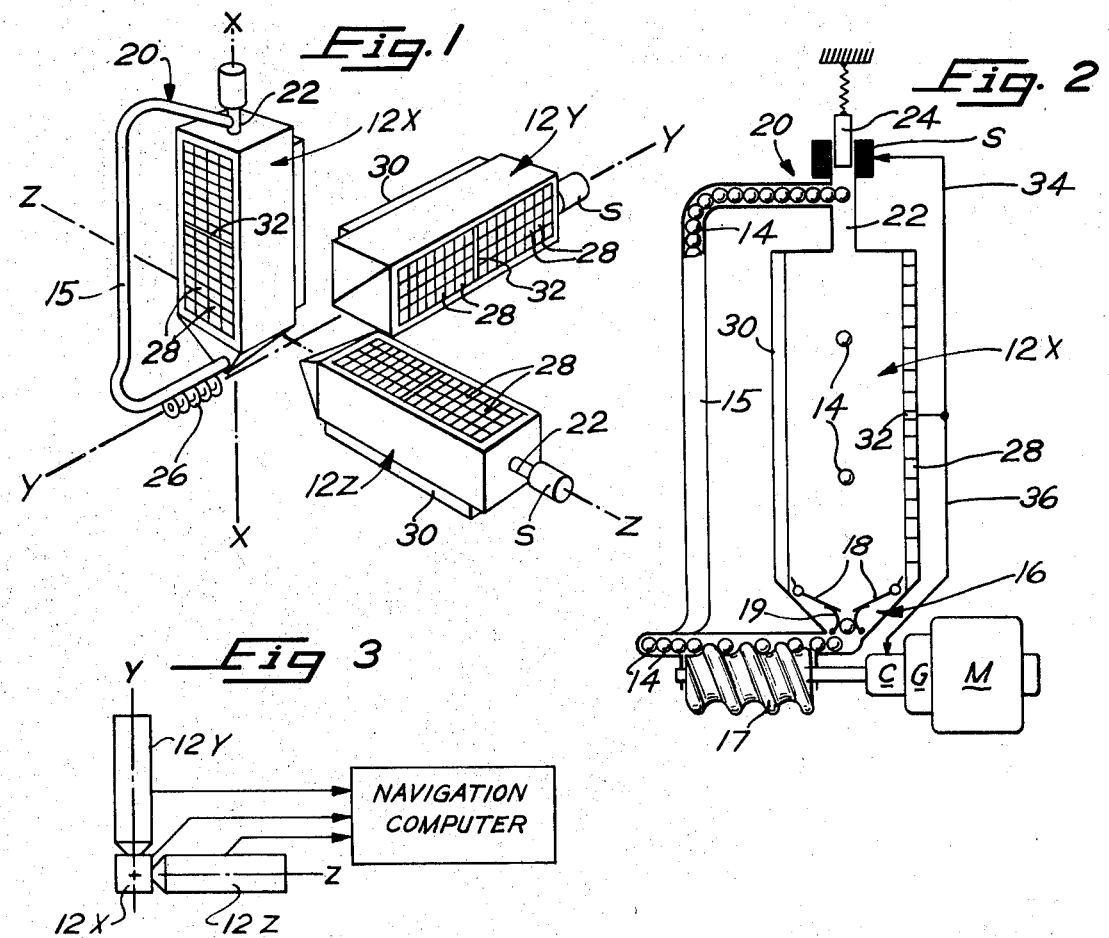
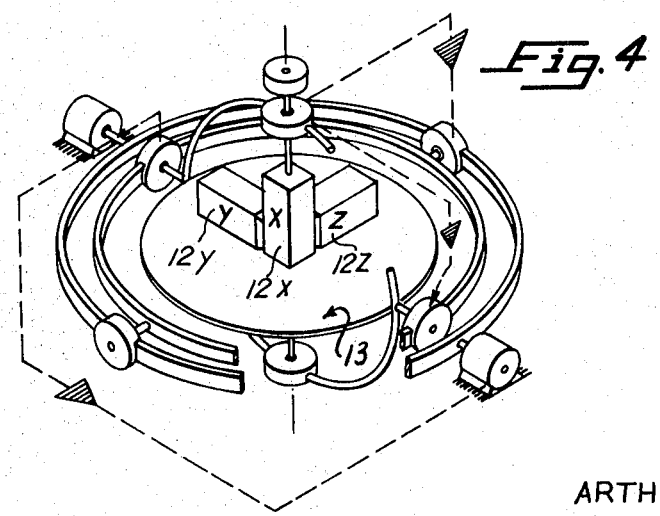
INVENTOR.
ARTHUR S. IBERALL
BY Bair, Freeman & Molinare
ATTYS.

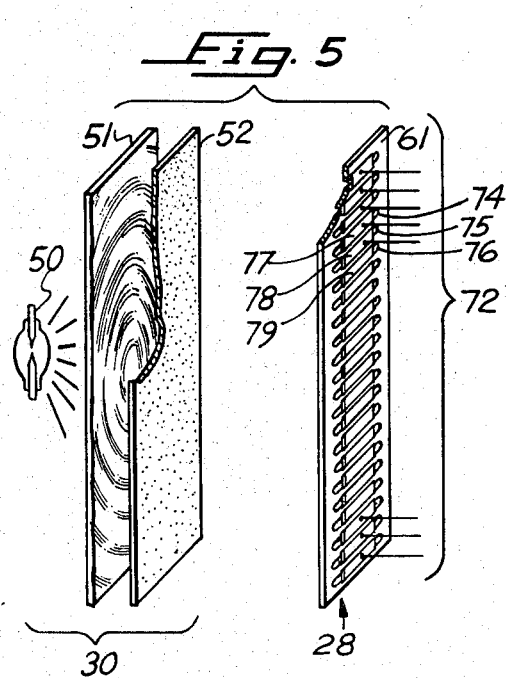
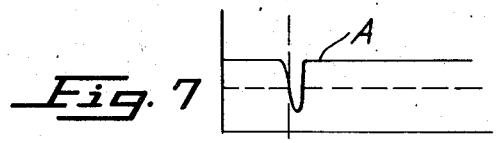
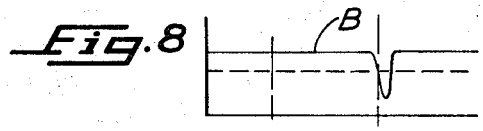
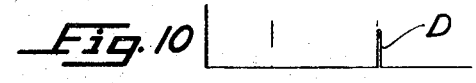
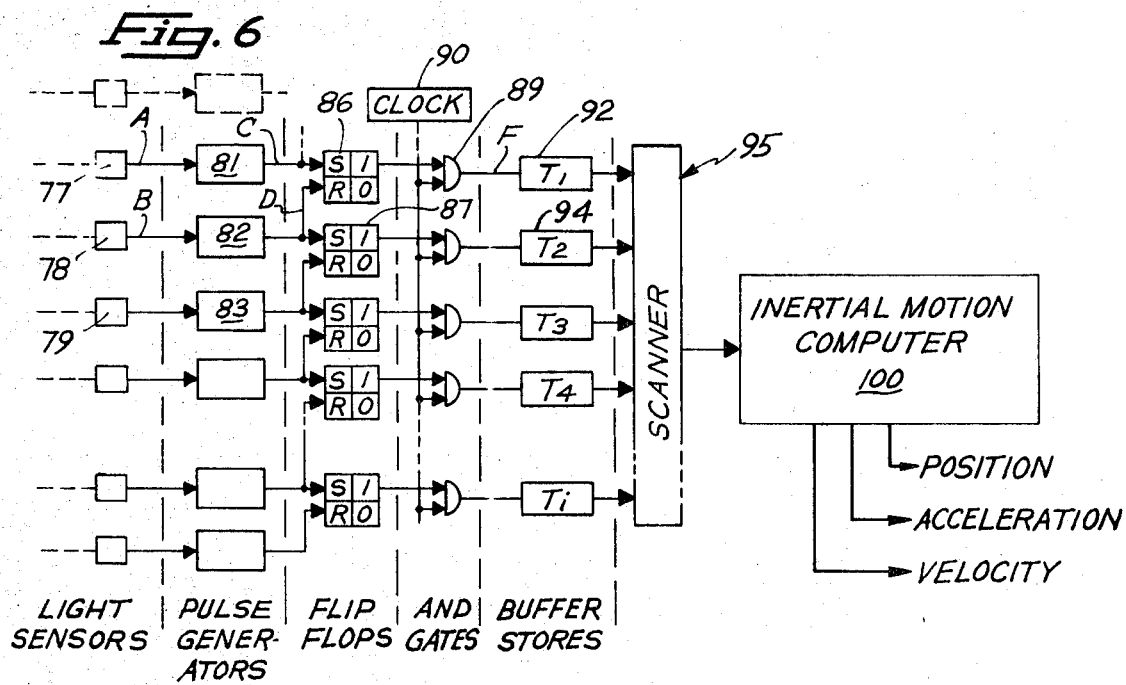

United States Patent Office 3,559,478
Patented Feb. 2, 1971

3,559,478
INERTIAL SENSING SYSTEM FOR USE IN
NAVIGATION AND GUIDANCE
Arthur S. Iberall, Norberta, Pa., assignor to General
Technical Services Inc., a corporation of Ohio
Continuation-in-part of application Ser. No. 451,753,
Apr. 29, 1965. This application Apr. 5, 1967, Ser.
No. 628,652
Int. Cl. C01c 21/16
U.S. Cl. 73—178                                        5 Claims

ABSTRACT OF THE DISCLOSURE

An inertial guidance system in which a sequence of free bodies (such as balls) are launched through a sensing chamber affixed to a vehicle. Photoelectric detectors are employed for monitoring the motion of each body. Changes in the position, velocity, or acceleration of the sensing chamber are manifested as apparent departures from the "expected" motion of each body. These departures are translated into electrical signals representative of the motion of the vehicle.

CROSS-REFERENCE TO RELATED APPLICATION

This is a continuation-in-part of U.S. application Ser. No. 451,753 filed Apr. 29, 1965, now abandoned.

BACKGROUND OF THE INVENTION

This invention relates to an inertial guidance system using a free body that is not affected by contacting forces and has minimal interaction with action-at-a-distance forces (other than gravity) in order to provide such a system that is near-perfect, and superior to a gyroscopic guidance system wherein an error-producing frictional force is coupled into the system although such a system uses a sound conservation of angular momentum principle.

SUMMARY OF THE INVENTION

One object of the present invention is to provide an inertial sensing device in which a stream of free bodies such as balls or the like pass through a field of detection in such manner that as one body leaves the field of information of positional reference, namely, position and velocity, the motion of a second free body in the field is so prescribed that by a continued sequence of such passages, information about inertially determined position in space-time from free body to free body in a continued chain is secured.

Another object is to utilize the data secured from the field of detection to actuate a guidance controller, the detecting means and the controller being mounted on a vehicle guided by the controller.

Still another object is to provide an array of plural fields of detection as for instance, on X, Y and Z axes which may feed data to a navigation computer which can compute passage of space relative to the inertial coordinate system established by the balls during their free flight and which then can reference the path to a course route chart which is also coupled so that the output of the navigation computer may be fed to a guidance controller, thereby coordinating the guidance of the vehicle with both the inertial sensing array and the course route chart to maintain the vehicle on a prescribed course which is continuously corrected by operation of the fields of detection of the inertial sensing array.

A further object is to associate a precise clock timing operation with the computer so that the short portions of observed free flight path are accurately related to the course route chart in time by the navigation computer.

Still a further object is to provide an inertial guidance system in which the essential characteristic is the use of free bodies presented serially whose motion is observed and well defined in their path relative to a sensing chamber fixed to the guided vehicle. Three sensing chambers may be oriented in an orthogonal array to sense three mutually perpendicular directions referenced to the vehicle in which they are mounted. The results from the sensing chambers are utilized for actuating a guidance controller for the vehicle.

With these and other objects in view, the invention consists in the construction, arrangement and combination of the various parts of my inertial guidance system; whereby the objects above contemplated are attained, as hereinafter more fully set forth, pointed out in the claims and illustrated in detail on the accompanying drawings.

BRIEF DESCRIPTION OF THE DRAWINGS

An inertial guidance system according to the invention and containing the essential elements for a workable vehicle guidance system is illustrated on the drawings, wherein:

FIG. 1 is a diagrammatic perspective view of three orthogonally arranged sensing chambers forming the fields of detection of an inertial guidance system;

FIG. 2 is a diagrammatic cross section of one of the sensing chambers to illustrate the operation of a stream of free bodies therethrough;

FIG. 3 is a block diagram of the components of an inertial guidance system using the sensing chambers to provide input information for a navigational computer;

FIG. 4 is a diagrammatic perspective view of a gimbal mounting arrangement for the sensing chambers;

FIG. 5 is an exploded perspective view showing the interior construction of a sensing chamber;

FIG. 6 is a block schematic representation of a logic circuit adapted for use in conjunction with a sensing chamber constructed as shown in FIG. 5; and FIGS. 7 through 12 depict a series of waveforms which illustrate the operation of the logic circuit shown in FIG. 6.

DESCRIPTION OF THE PREFERRED EMBODIMENTS

As shown in FIG. 1 of the drawings, a series of three sensing chambers 12X, 12Y and 12Z are provided on orthogonal axes X, Y and Z. By way of example, X may be the vertical axis, Y a preferred longitudinal axis, and Z a lateral axis. These terms are relative only as they might be applied to an aircraft in reference to the earth whereas all types of vehicles are contemplated for use of my inertial sensing system for navigation or guidance, such as space craft or interplanetary craft whose orientation axes might be named differently.

The three sensing chambers 12X, 12Y and 12Z may be rigidly attached to a rigid base plate. This base plate may be: (a) rigidly attached to a strong load bearing portion of the frame of a vehicle, in what is known as a strapdown configuration; or (b) gimbal mounted within a frame (as shown in FIG. 4), the frame being mounted on the vehicle and driven so as to maintain desired relations to a primary inertial system referenced, for example, to the "fixed" stars. The relations between any two orthogonal coordinate systems which are relatively rotating and translating are described in the literature of mechanics and computational auto-mechanization and in the literature of inertial guidance.

The base plate 13 shown in FIG. 4 may be driven by known gyroscopic servo-mechanisms so as to maintain the three chamber axes parallel to a primary inertial system. Alternatively, the base plate may be driven by servo-mechanisms so as to maintain one of the chamber axes (typically the one perpendicular to the base plate) directed along the vector direction of maximum acceleration plus gravity, namely, along the direction that a free body will accelerate, with no instantaneous rotation around that axis. As will be explained, the three sensing chambers may themselves be used to provide both information from which to drive the base plate platform into non-rotating configurations as well as information from which to compute the position of the platform in any known gravitational field that the vehicle traverses.

Positional determination of base plate coordinates can be made from either the strap down configuration or gimballed configurations. The specific mechanization of the computation involved for these different configurations have been treated in the literature and need not be treated here other than by example. In this disclosure, a simple descriptive embodiment in which the sensing chambers are gimbal mounted and maintained in alignment with the primary inertial reference will be used.

Each of the chambers, 12X, 12Y and 12Z carries a mechanism for dispensing the inertial test mass free bodies (illustratively high quality balls 14 shown in FIG. 2) into a mechanical trap door ball catcher 16 which is located opposite the ball dispenser 20 to retrieve the balls from the sensing chamber and return them into a ball recirculating system (transit tube 15) where they may be returned to the ball dispensers. The trap door of the catcher 16 is indicated at 18 in FIG. 2. The trap door 18 has stops to prevent its inward opening. Spring pawls 19, located under each door are so shaped that the trap door deflects the spring sufficiently to allow the passage of the ball. On their spring back, the spring pawls 19 forcefully propel the ball on into a screw thread ball pump shown at 17 which carries the balls 14 through a tube 15 to a ball dispenser 20. The ball dispenser 20 comprises a guide tube 22 and a plunger 24 operable to project the balls one at a time through the guide tube 22. For this purpose a solenoid S may be provided, the plunger 24 being spring retracted so that when the solenoid is energized, the plunger will be drawn into the coil and strike the ball 14 immediately in front of it to project it through the chamber such as the chamber 12X shown in FIG. 2.

The ball dispenser 20 is triggered from an external precise timing signal to project or launch a ball through the guide 22 and the ball enters the sensing chamber 12X with sufficient injection velocity to proceed across a sensing field and to enter the trap door ball catcher without contact with the chamber walls.

A sensing element 32 is employed for triggering the ball dispenser 20 as through a suitable electric circuit connection 34. A second electric circuit connection 36 extends to a one-revolution clutch C operated by a gear drive G from a motor M and operable to drive the screw 17. Thus, if forces of acceleration or deceleration act on the chamber 12X as the balls 14 pass longitudinally therethrough, intermittent ball shadow signals, referenced in space to sensing elements 28 and in time by a clock, will appear closer or farther apart in time. The sensing zone within the chamber is arranged to obtain information about the ball velocity and directional motions in the path taken by the ball longitudinally of the chamber.

As a ball traverses a path through the sensing zone, its motion is monitored and as it approaches a specific point in the zone such as the sensing element 32, the injection of another ball into the chamber is triggered in an obvious manner.

As the ball proceeds through the sensing chamber its motions are detected, measured and monitored by means of an array of sensing elements 28 attached to the chamber wall.

As depicted in FIG. 5, the light beam source 30 is made up of light beam generating components which provide a collimated beam illumination of the sensing region of the chamber. The light beam source shown in FIG. 5 includes a point light source 50 with collimating lens (such as a Fresnel lens) 51. Alternatively, the source 30 may consist of an array of laser diodes, or of other light sources and optical elements appropriate to provide parallel illumination through the sensing region. The illumination desired for this embodiment is essentially similar to the parallel illumination used commonly in optical comparators employed for gauging small mechanical parts. Because of the collimated nature of the light, diffraction limited shadows of the test body are produced to true size no matter where the test body is located within the illuminated sensing region. As indicated in FIG. 5, photographically prepared shaded transmission mask 52 may be used as part of the illuminator to provide uniform light intensity over the whole region of the chamber.

Parallel light traverses the sensing chamber to the light sensing array 28. In passing through the chamber, the parallel light is intercepted by one after another of the free test bodies which produce shadows on mask 61 of light receiver set 66. The mask 61 is arranged with a plurality of parallel slits normal to the long axis of the sensing chamber. These slits define positions and intervals of distance along the sensing chamber. For example, a shadow of a test body which has traveled half way along the sensing chamber will cross one of the slits which is located half way along the mask. Mask 61 also serves as a frame on which are mounted a number of photovoltaic detectors, one behind each slit. The photosensitive elements may be semiconductor photovoltaic diodes, photoconductors, photoresistors, phototransistors, or the like. Each of the photosensitive elements is connected to one signal conductor in the array of conductors indicated by the bracket 72 in FIG. 5.

As the moving free test body (indicated at 14 in FIG. 2) passes through the illuminated region between the light source 30 and the array of sensors 28, shadows are cast on individual sensors 70 to produce a succession of electrical pulses which appear in sequence on the array of conductors 72. As illustrated by FIGS. 6 through 12 of the drawings, the time duration between these pulses may be employed to provide accurate measure of test body longitudinal position, velocity, and acceleration with respect to the chamber.

In FIG. 5, the parallel light from the light source 30 passes the light receiver slits 74, 75, 76 to the corresponding photosensors 77, 78 and 79. The distance separating the slits 74 and 75 is equal to the distance separating slits 75 and 76 and so on for adjacent slits. As a test body launched into the sensing chamber moves past the slits, pulses are produced at the output of each photosensor at specific times as indicated by FIGS. 7 and 8 of the drawings. The waveform A appears at the output of sensor 77, while the waveform B appears at the output of sensor 78. As may be noted by comparison between FIGS. 7 and 8, the pulse in waveform A precedes the pulse in waveform B by time $t_1$, the transit time of the moving test body shadow between slits 74 and 75. The outputs of sensors 77, 78 and 79 are applied to the inputs of pulse generators 81, 82 and 83 respectively to trigger as indicated in FIG. 6. These pulse generators may take the form of blocking oscillators capable of producing an output pulse having a fast rise time whenever the input voltage from the connected sensor falls below a predetermined value (indicated by the horizontal dashed lines in FIGS. 7 and 8). Consequently, the leading edges of pulses in waveforms C and D (the output waveforms from pulse generators 81 and 82, respectively) are also separated by time $t_1$.

The output pulses from the pulse generators shown in FIG. 6 are employed to set and reset "flip-flop" devices as indicated in FIG. 6. The waveform C from the output of pulse generator 81 is applied to the SET input of flip-flop 86. The pulse waveform D from the output of pulse generator 82 is applied to the RESET input of flip-flop 86 and to the SET input of flip-flop 87. Similarly, each of the remaining pulse generators is connected to set and reset the remainder of the flip-flops in the chain. As indicated by the waveform E shown in FIG. 11, the flip-flop 86 is energized whenever a pulse is received from pulse generator 81 and is deenergized whenever a pulse is received from pulse generator 82. The width of the output pulse from flip-flop 86 is thus equal to $t_1$, the transit time of the object shadow between the optical slits 74 and 75.

The output of flip-flop 86 is connected to one input of an AND gate 89, the input of which is connected to a source of clock pulses 90. The pulse from flip-flop 86 thus has the effect of gating a predetermined number of clock pulses from the clock source 90 and through AND gate 89 to the input of a buffer store indicated at 92. The remainder of the circuitry performs in an identical fashion such that each of the buffer stores receives and temporarily holds a pulse count proportional to the transit time between an adjacent pair of optical slits within the sensing chamber. Thus, the second buffer store indicated at 94 receives and retains a pulse count related to the transit time of a test body between optical slits 75 and 76. The buffer stores may preferably take the form of destructive readout memories which store the count in binary form. The gating of clock pulses into buffers should be sufficiently fast so that no clock pulses are lost. Comparison intervals with the running clock should give the same number of pulses, as a performance check.

The buffer stores are read by a scanner indicated generally at 95 which preferably scans the buffer stores at a cycling rate equal to or greater than the rate at which the objects are launched into the sensing chamber as indicated in FIG. 2. The scanner thus feeds a series of binary code groups, each of which is indicative of a transit time between two adjacent light slit positions, into an inertial motion computer 100. The computer 100 makes repeated calculations of the relative inertial motion to which each of the moving objects in the sensing chamber has been subjected, each calculation being based on a pair of transit time pulse counts, and, on summation of counts from the beginning slit to the end slit. Using known techniques, the computation of position, velocity, and acceleration may be made based upon the transit time information stored in the buffer stores.

By way of example, the inertial acceleration indicated by the free bodies when the chamber is accelerated may be computed as explained below:

If the average velocity of an object as its shadow passes between the sensors 77 and 78 is called $V_1$ and the average velocity between sensors 78 and 79 termed $V_2$, then an increase in average velocity may be written:

$$\Delta V = (V_2 - V_1) = \left(\frac{S}{t_2}\right) - \left(\frac{S}{t_1}\right) = \frac{S(t_1-t_2)}{t_1 t_2}$$

where "S" is the distance between sensors.

Since acceleration is equal to change in velocity per unit time, and since the above-written velocity change takes place in a time which is accurately approximated by the average between transit times $t_1$ and $t_2$, acceleration A may be written:

$$A = \frac{S(t_1-t_2)}{t_1 t_2} \times \frac{2}{t_1+t_2} = \frac{K(t_1-t_2)}{t_1 t_2 (t_1+t_2)}$$

where "K" is a constant of proportionality.

As will be readily appreciated by those skilled in the art, the computer 100 provides an updated figure for acceleration each time a pair of adjacent buffer stores containing transit time counts are scanned. Although computational errors may be minimized by increasing the pulse repetition rate from clock 90, and through well known error correction techniques, computational accuracy may be still further improved by forming a short-term average of the acceleration calculations produced by computer 100. This average may be obtained by either analog or digital techniques well known in the art. The electrical signal from the computer 100 or from a subsequent averaging device may then be applied to conventional instrumentation systems of the type presently employed in connection with mass-spring and gyroscopic accelerational measuring equipment.

In accordance with the invention, inertial motion information is obtained from a sequence of free bodies which are in the sensing chamber for overlapping periods. As one ball is in the process of leaving its sensing field, a second ball is being injected into the field. For an overlapping period there is displacement data available from both balls and both balls should be producing the same acceleration data (i.e., they are both free bodies in a gravitational field) and nearly the same velocity data.

The sensing chambers are constructed to isolate the free body test masses from sources of disturbance other than external gravitational fields. The injection of each individual ball should be made as reproducible as possible but does not need to be perfectly so since variations are accounted for. The accuracy of position and velocity of the ball determined by the sensing elements 28 represents one inherent limitation to information precision but this limitation lies theoretically only at the level of the quantum mechanical uncertainty principle, and practically at the level of accuracy of the sensing elements used. For example, with the illustration of an optical shadowing, position detection at interferometer levels of fractions of an optical fringe are possible. The only other source or sources that present inherent limitations to information precision are interacting energy sources that can continuously add position disturbing information to the ball from outside, during its traverse. In contrast, conventional test mass suspensions, whether mechanical, magnetic, or electrostatic have this disturbance character.

Thus another purpose of the invention is to provide means by which the interaction with the ball (note, the ball position can only be determined if there is a sensing interaction involving energy transfer) can be kept to a minimum. Such means include isolation by evacuation, shielding from external electric, magnetic and high energy particle fields, and the use of the weakest, most symmetrical, and shortest illumination (i.e., impulsive) light sensing rather than any mechanical, magnetic, electrical or other sensing, for the very minimum sensing could be represented by the number of quanta of light that must interact with the ball to provide its positional information. While in its development stage such precautions are unnecessary, as the accuracy levels are raised, ultimately the quantum mechanical performance limitations posed by the uncertainty principle, here in the form of light energy—time interaction, should represent the only real remaining limitation. The other type of disturbance is indeterminate masses that present a fluctuating gravitational potential to the test mass. The inertial guidance is predicated on a knowledge in inertial space-time of the major gravitational masses to be encountered. Error sources, in the main, would be small persistent gravitational biases in the vicinity. This can be corrected for by the external placement of small compensating masses, somewhat similar to compensation made in magnetic compasses. It is for such reasons that the free body detecting system is chosen to be of finite appreciable size and separation rather than molecular or nuclear, and with a stream at only a few balls rather than a large indeterminate swarm of balls. This sensor technique is applicable to all navigational problems. Thus it can be used as a substitute in all places where a gyro may be used, such as attitude control in ships and other moving craft, or inertial platforms, or in all places where orientation information by such means as force fields is used. This includes pendula, or other test masses, such as bubbles. A specific illustration may be added for application to inertial guidance systems for 3-dimensional craft.

Assuming that the platform is maintained stable by a servo system based on the rotation of the balls, by the use of a gyro-system, or alternatively by the use of an optical system referenced to fixed star axes—then the computation of inertial position of the platform, and therefrom, of the vehicle, can be accomplished as follows:

It is assumed, by transfer from the previous ball transit, that the coordinates of the newly injected ball have been determined, and are now known. The ball motion in such primary coordinates—which have been updated along the unfolding vehicle track path in a primary inertial coordinate system—will be described during its flight epoch (0 to $t$) by $$x_1 = x_{10} + \dot{x}_{10}t + \frac{\ddot{x}_{10}t^2}{2}, \text{ etc.}$$

The parameters $x_{10}$, $\dot{x}_{10}$ and $\ddot{x}_{10}$ are known from the previous updating, and from the location of gravitational masses along the vehicle track in the primary coordinate system.

During the transit epoch, the vehicle may not follow the ball path. The vehicle may receive unknown acceleration during this epoch, and as a result, its motion will diverge from the ball. Such displacement motion will be directly indicated by the apparent nonlinear track in time of the ball with reference to its chamber. The divergence of this track from linearity in time is the direct measure of the acceleratory motion of the chamber, its platform, and thus, through the kinematic equations for the gimballed linkages, of the vehicle away from the ball. It is a primary characteristic of this sensing system, that the acceleratory effects need not be obtained by mathematical integration of an acceleration signal as in accelerometer sensors, but may be obtained simply by subtraction of relative positions. If the motion of the vehicle persisted in a linear path, then the ball motion would appear to be parabolic with time. This is the "expectation." If the vehicle had a free body motion, then the ball path would appear to be linear with time. In a primary coordinate system, thus, the deviation from the expected parabolic path is what determines the deviation from continued motion in a straight line. Thus the quantity that must be computed is $$x_b - x_{20} - \dot{x}_{20}t - \frac{\ddot{x}_{20}}{2}t^2$$

$x_b =$ apparent ball motion in the chamber

The parameters $x_{20}$ and $\dot{x}_{20}$ were determined during the latter portion of the previous ball's transit. Thus at the end of the epoch, i.e., when the ball passes the last grid position at which the chamber position is to be determined, and stored, the noted time permits computation of the location of that grid point in primary inertial space. Through the kinematic linkages, the vehicle position, say its center of gravity, can then be computed.

Thus in FIG. 3 is illustrated in block diagram a system capable of inertial navigation or guidance which includes the sensing system which is the object of my invention. Other than the sensing system, the measuring and computing elements prescribed lie within current instrument and computer art, and can be designed and programmed by those skilled in these arts.

There is a course route chart stored in a computer memory. Such a chart may be stored as a sequence of initial ball positions, velocities, and gravitational accelerations associated with these positions and velocities (i.e., wth the expected distribution of large gravitational masses along the space-time course). In this embodiment, the guidance controller's problem is to regulate the vehicle motion in six degrees of freedom so that the actual relative motions of injected balls and chambers very nearly agree at all times with the preprogrammed and stored relative motions. In actual practice, a number of more complex computed trip error corrections allow the controller much greater navigational latitude.

The sensing array is mounted on a servo controlled platform which is maintained by three or more servo motors, operating through gimbals, so as to prevent increase of rotation of each of the balls in the three chambers.

From each chamber, there emerges a sequence of electrical signals which represent transits of the grid by ball shadow. These sharp signals represent $x_i$, $y_i$, or $z_i$ displacements for the $i$th ball in transit. These signals are correlated with time by a precise clock and stored electrically in a memory. The pilot's problem is to make this sequence agree with the sequence stored in course route memory.

The system disclosed eliminates the involvement of energy couplings that introduce noisy forces that act directly or through a distance on the motion of the test body, (the free ball or balls) except for the very minimal interactions which must exist by quantum mechanical uncertainty principle interactions. Thus I am using a principle which need only interact in a minimal way, namely by picking up information from the free test mass system by the minimal interaction of light quanta delivered only intermittently, as information is needed, to detect the test mass flight path in the sensing chambers. All other systems such as gyros, electrostatic gyros, or other unconventional inertial sensors have heretofore utilized a continuous interaction with the environment which thus generally permits noise to enter the test system and spoil the purity of its assumed motion. Most commonly the interaction has been at the level of friction, so that misleadingly, the problem has been regarded as reduction of friction, rather than as elimination of coupling. Even in devices as various non-contacting support systems, such as the electrostatic gyro, the noise coupling exists through the action-at-a-distance support forces. It is only by attempting a complete freedom from support forces, except for the necessary coupling with gravitational forces which theory today does not permit shielding against, and the briefest, weakest, most symmetrical interaction, with such energies as are used or needed for position or velocity detection, that a more complete isolation from error producing source can be achieved.

Individual balls are used as free body detectors, the information is transferred from one such system to the next such system and the information flows to a reference system, known with regard to the vehicle, so that the positional information flows from a cell-type detector to the reference system.

The embodiment of the invention which has been disclosed is merely illustrative of one application of the principles of the invention. Numerous modifications can, of course, be made without departing from the real spirit and purpose of my invention.

I claim as my invention:

1. In an inertial guidance system, an elongated hollow sensing chamber, means for launching a continuing series of bodies down the length of said chamber such that at all times one of said bodies is in a ballistic free-fall condition, each two successive bodies being simultaneously present in said chamber during an overlap time period, and timing means for measuring changes in the velocity of each of said bodies longitudinally of said chamber while in said free-fall condition, said timing means including means for simultaneously measuring changes in the velocity of said two successive bodies during said overlap time period.

2. In an inertial guidance system according to claim 1, said timing means including clock means for measuring the transit time of said free body between predetermined points in said chamber.

3. In an inertial guidance system according to claim 1, a sensing element in said chamber responsive to the passage thereby of a free body for triggering said first mentioned means to project the following free body into said sensing chamber.

4. In an inertial guidance system according to claim 1, means connected to said chamber and to said launching means for returning said free bodies after they have passed through said sensing chamber to said launching means.

5. In an inertial guidance system according to claim 4, a sensing element in said chamber responsive to the passage thereby of a free body for triggering said launching means and said means for returning free bodies to launching of the following free body into said sensing chamber and to effect operation of said means for returning free bodies.

References Cited

UNITED STATES PATENTS

| | | | |
|---|---|---|---|
| 2,319,932 | 5/1943 | Jacobs | 73—505 |
| 2,641,458 | 6/1953 | Gilvarry et al. | 73—517 |
| 2,401,609 | 6/1946 | Burgess | 33—70(B) |
| 2,647,323 | 8/1953 | Johnson et al. | 33—141.5 |
| 3,073,550 | 1/1963 | Young | 244—3.21X |
| 3,194,948 | 7/1965 | Alexander et al. | 73—178X |
| 3,200,510 | 8/1965 | Hunter | 33—204(.3) |
| 3,229,520 | 1/1966 | Savet | 73—178 |
| 3,233,848 | 2/1966 | Byrne | 244—3.21X |
| 3,237,887 | 3/1966 | Theiss | 73—178X |
| 3,261,209 | 7/1966 | Rae | 33—204(.3)UX |

FOREIGN PATENTS

| | | | |
|---|---|---|---|
| 541,132 | 4/1922 | France | 73—517 |
| 188,696 | 11/1922 | Great Britain | 73—505 |

ROBERT B. HULL, Primary Examiner

U.S. Cl. X.R.

33—204; 73—505, 517; 235—150.2